(12) United States Patent
Cher (10) Patent No.: US 9,280,383 B2
(45) Date of Patent: Mar. 8, 2016

(54) CHECKPOINTING FOR A HYBRID COMPUTING NODE

(71) Applicant: International Business Machines Corporation, Armonk, NY (US)

(72) Inventor: Chen-Yong Cher, Port Chester, NY (US)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 14/302,921

(22) Filed: Jun. 12, 2014

(65) Prior Publication Data

US 2015/0363225 A1    Dec. 17, 2015

(51) Int. Cl.
*G06F 9/46* (2006.01)
*G06F 9/48* (2006.01)

(52) U.S. Cl.
CPC .......... *G06F 9/4818* (2013.01); *G06F 9/4881* (2013.01); *G06F 9/461* (2013.01)

(58) Field of Classification Search
CPC ....................................................... G06F 9/461
USPC ....................................................... 718/108
See application file for complete search history.

(56) References Cited

U.S. PATENT DOCUMENTS

| | | | |
|---|---|---|---|
| 8,489,817 B2 | 7/2013 | Flynn et al. | |
| 2007/0043934 A1 | 2/2007 | Sodani et al. | |
| 2010/0095152 A1* | 4/2010 | Darrington | G06F 11/1438 714/19 |
| 2010/0122199 A1* | 5/2010 | Darrington | G06F 11/1438 715/771 |
| 2011/0246823 A1 | 10/2011 | Khan et al. | |
| 2012/0054771 A1* | 3/2012 | Krishnamurthy | G06F 9/4881 718/105 |
| 2012/0084782 A1 | 4/2012 | Chou et al. | |

FOREIGN PATENT DOCUMENTS

WO    WO2013101038    7/2013

OTHER PUBLICATIONS

Xiangyu Dong et al., "Hybrid Checkpointing Using Emerging Non-volatile Memories for Future Exascale Systems", Jul. 2011, ACM Transactions on Architecture and Code Optimization, vol. 8, No. 2, Article 6, pp. 1-29.*
Jiannong Cao et al., "Checkpointing in hybrid distributed systems", Proceedings of the 7th International Symposium on Parallel Architectures, Algorithms and Networks (ISPAN'04), 2004, pp. 1-6.*

(Continued)

*Primary Examiner* — Wei Zhen
*Assistant Examiner* — Lanny Ung
(74) *Attorney, Agent, or Firm* — Cantor Colburn LLP; William Stock (57) ABSTRACT

According to an aspect, a method for checkpointing in a hybrid computing node includes executing a task in a processing accelerator of the hybrid computing node. A checkpoint is created in a local memory of the processing accelerator. The checkpoint includes state data to restart execution of the task in the processing accelerator upon a restart operation. Execution of the task is resumed in the processing accelerator after creating the checkpoint. The state data of the checkpoint are transferred from the processing accelerator to a main processor of the hybrid computing node while the processing accelerator is executing the task.

17 Claims, 4 Drawing Sheets

(56) References Cited

OTHER PUBLICATIONS

S. Agarwal, et al., "Adaptive Incremental Checkpointing for Massively Parallel Systems," In Proceedings of the 18th annual international conference on Supercomputing (ICS '04), Jun. 26-Jul. 1, 2004, 10 pages.
List of IBM Patents or Patent Applications Treated as Related for U.S. Appl. No. 14/302,947, filed Jun. 12, 2014, 1 page.
M. Bougeret, et al., "Checkpointing strategies for parallel jobs," High Performance Computing, Networking, Storage and Analysis (SC), 2011 International Conference for IEEE, Nov. 12-18, 2011, 11 pages.
K. Sato, et al., "Design and Modeling of a Non-blocking Checkpointing System," SC12, Nov. 10-16, 2012, 10 pages.
A. Moody, et al., "Design, Modeling, and Evaluation of a Scalable Multi-level Checkpointing System," High Performance Computing, Networking, Storage and Analysis (SC), 2010 International Conference for IEEE, Nov. 13-19, 2010, 11 pages.
W.M. Jones, et al., "Impact of Sub-optimal Checkpoint Intervals on Application Efficiency in Computational Clusters," Proceedings of the 19th ACM International Symposium on High Performance Distributed Computing, ACM 2010, Jun. 20-25, 2010, pp. 276-279.
L. Gomez, et al., "Low-overhead diskless checkpoint for hybrid computing systems," 2010 International Conference on High Performance Computing (HiPC). Dec. 19-22, 2010, 10 pages.
T. Islam, et al., "McRengine: A Scalable Checkpointing System Using Data-Aware Aggregation and Compression," SC12, Nov. 10-16, 2012, 11 pages.
K. Mohror, et al., "Trace profiling: Scalable event tracing on high-end parallel systems," Parallel Computing 38(4-5), (Apr. 2012) pp. 194-225.

\* cited by examiner

CHECKPOINTING FOR A HYBRID COMPUTING NODE

STATEMENT REGARDING FEDERALLY SPONSORED RESEARCH OR DEVELOPMENT

This invention was made with Government support under contract number B599858 awarded by the Department of Energy. The Government has certain rights in this invention.

BACKGROUND

The present invention relates generally to computer systems, and more particularly to establishing checkpoints on a hybrid computing node.

In computer systems that include multiple processing resources for executing a plurality of tasks, distribution of task execution is important to system performance. Some computing systems include processing accelerators that assist a main processor in executing tasks. Memory bandwidth intensive tasks can be distributed to processing accelerators that have locally available memory with a high bandwidth, and processing results can be reported back to the main processor.

In high-performance computing, applications execute over long periods of time. To support error recovery, checkpoints can be established periodically to capture the state of critical values needed to restart execution and recover from an error condition. In systems of higher complexity, checkpoint overhead typically increases while decreasing overall available processing throughput. Latency associated with slower bandwidth paths further increases checkpoint overhead.

SUMMARY

According to one embodiment, a method for checkpointing in a hybrid computing node includes executing a task in a processing accelerator of the hybrid computing node. A checkpoint is created in a local memory of the processing accelerator. The checkpoint includes state data to restart execution of the task in the processing accelerator upon a restart operation. Execution of the task is resumed in the processing accelerator after creating the checkpoint. The state data of the checkpoint are transferred from the processing accelerator to a main processor of the hybrid computing node while the processing accelerator is executing the task.

According to another embodiment, a hybrid computing node includes a main processor and a processing accelerator that includes a local memory and one or more compute engines configured to perform a method. The method includes executing a task in the processing accelerator of the hybrid computing node. A checkpoint is created in the local memory of the processing accelerator. The checkpoint includes state data to restart execution of the task in the processing accelerator upon a restart operation. Execution of the task is resumed in the processing accelerator after creating the checkpoint. The state data of the checkpoint are transferred from the processing accelerator to a main processor of the hybrid computing node while the processing accelerator is executing the task.

According to a further embodiment, a computer program product for checkpointing in a hybrid computing node is provided. The computer program product includes a tangible storage medium readable by a processing circuit and storing instructions for execution by the processing circuit to perform a method. The method includes executing a task in a processing accelerator of the hybrid computing node. A checkpoint is created in a local memory of the processing accelerator. The checkpoint includes state data to restart execution of the task in the processing accelerator upon a restart operation. Execution of the task is resumed in the processing accelerator after creating the checkpoint. The state data of the checkpoint are transferred from the processing accelerator to a main processor of the hybrid computing node while the processing accelerator is executing the task.

DETAILED DESCRIPTION

An embodiment is directed to establishing checkpoints on a hybrid computing node. A hybrid computing node includes a main processor and one or more processing accelerators with local memory to offload processing tasks from the main processor. A high bandwidth interface exists between each processing accelerator and its local memory, while a lower bandwidth interface exists between the processing accelerator and the main processor. A local checkpoint phase performs checkpointing locally within each processing accelerator to store state data in local memory of each processing accelerator. A transfer phase copies the locally stored checkpoints from each processing accelerator to another domain, such as another memory system or a network for storage. The transfer phase can be performed in parallel with execution of tasks by each processing accelerator. The transfer of the state data of the checkpoints may be performed asynchronously over the lower bandwidth interface, effectively hiding associated latencies with the processing accelerator computations.

Figure 1:
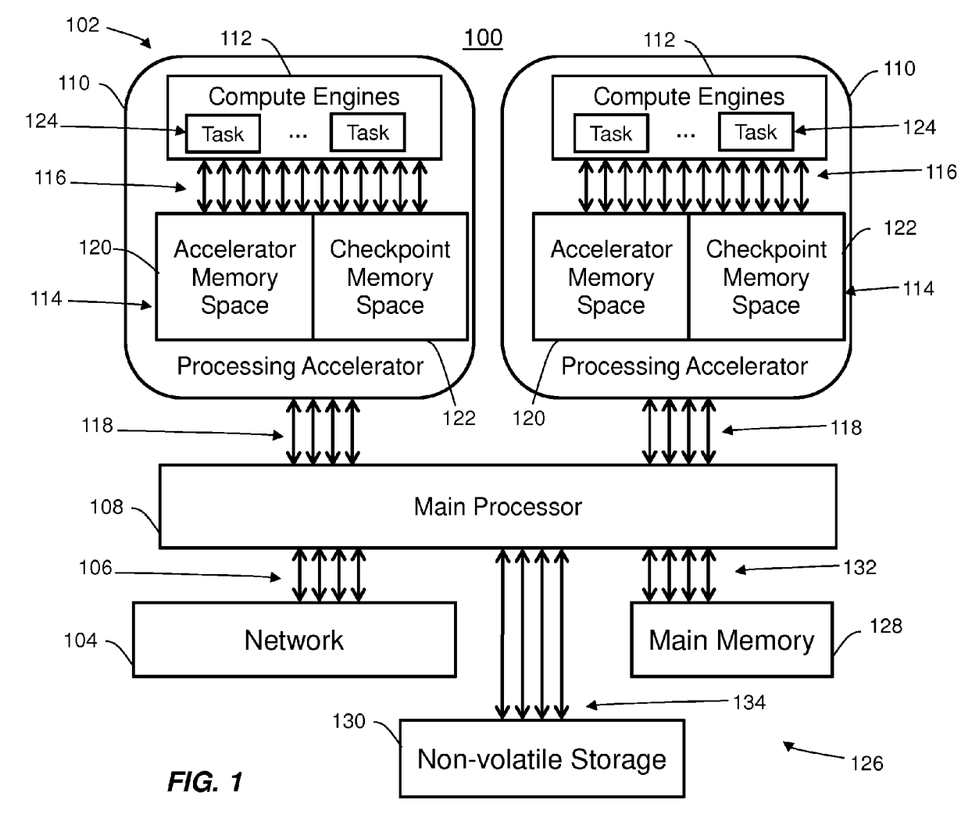
FIG. 1 illustrates a block diagram of a hybrid processing system in accordance with an embodiment.

Turning to FIG. 1, an example of a hybrid processing system 100 is depicted according to an embodiment. The hybrid processing system 100 includes at least one hybrid computing node 102 which may be coupled to a network 104 by a network interface 106. The hybrid computing node 102 includes a main processor 108 and one or more processing accelerators 110. Although the example of FIG. 1 depicts two processing accelerators 110 coupled to the main processor 108, any number (e.g., one or more) of processing accelerators 110 can be coupled to the main processor 108. The main processor 108 may be virtually any custom made or commercially available processor or processing circuit, such as a general purpose processor, a digital signal processor, a microcontroller, an application specific integrated circuit, a field programmable gate array, or the like. The processing accelerators 110 can include any combination of one or more of a general processing unit or active memory device. Each processing accelerator 110 can include compute engines 112 and local memory 114.

The compute engines 112 are capable of performing a variety of tasks, such as arithmetic operations, loads, stores and decrements. In one embodiment, the compute engines 112 receive commands from the main processor 108, where the commands include a series of instructions to be performed by the compute engines 112. The local memory 114 may be any suitable memory type, such as one or more random access memory "RAM" chips or dies. In an embodiment, when implemented as an active memory device, processing accelerator 110 can include layers of memory that form a three dimensional ("3D") memory device where individual columns of memory chips or dies form memory stacks or vaults as the local memory 114. Each memory stack may have one of the compute engines 112 associated with it. Alternatively, the compute engines 112 can be pooled and available to perform instructions using any of the memory stacks of the local memory 114. A higher speed interface 116 can be implemented between the compute engines 112 and the local memory 114, which operates at higher bandwidth than a lower bandwidth interface 118 between the processing accelerators 110 and the main processor 108. The higher speed interface 116 may be an interconnect network, such as a crossbar switch, that enables multiple communication paths between the compute engines 112 and the local memory 114.

In an exemplary embodiment, the local memory 114 is subdivided into an accelerator memory space 120 and a checkpoint memory space 122. The compute engines 112 can interact with the accelerator memory space 120 in the local memory 114 when executing one or more tasks 124. The tasks 124 can be any type of executable sequence of instructions, such as an application program. Each of the processing accelerators 110 can create a checkpoint in the checkpoint memory space 122 to store state data that enables one or more of the tasks 124 to restart execution upon a restart operation after halting execution, e.g., due to an error condition. Upon creation of a checkpoint, execution of the tasks 124 is halted and state data can be copied from the accelerator memory space 120 to the checkpoint memory space 122 as a checkpoint. After copying, execution of the tasks 124 resumes with further updates to state data being made in the accelerator memory space 120. The state data of the checkpoint is transferred from the processing accelerators 110 to the main processor 108 of the hybrid computing node 102 while the processing accelerators 110 continue executing the tasks 124. A checkpoint can be created periodically based on a time interval, and may be created synchronously in parallel across the processing accelerators 110. Transferring of the state data from the checkpoint memory space 122 to the main processor 108 can be performed asynchronously on the lower bandwidth interface 118. The main processor 108 can transfer the state data of one or more checkpoints to the network 104 or another memory system 126 as other failure domains.

Memory system 126 can include, for instance, main memory 128 and non-volatile storage 130. A main memory interface 132 couples the main processor 108 to the main memory 128 and can include any suitable bus structure or communication link known in the art. The main memory interface 132 may operate at a lower bandwidth than the higher speed interface 116. Similarly, a non-volatile storage interface 134 couples the main processor 108 to the non-volatile storage 130 and can include any suitable bus structure or communication link known in the art. The non-volatile storage interface 134 may also operate at a lower bandwidth than the higher speed interface 116. Addition computer readable storage system types can also be included as part of the memory system 126 or as part of an input/output subsystem (not depicted).

It will be understood that the hybrid computing node 102 can include a number of other elements known in the art and not depicted, such as one or more power supplies, clocks, buffers, input/output devices, user interfaces, displays, operating systems, application code, and the like. The hybrid computing node 102 can be incorporated and scaled into various types of computer systems, such as large-scale data processing centers, servers, workstations, personal computers, laptop computers, tablet computers, mobile computing devices, and the like.

Figure 2A:
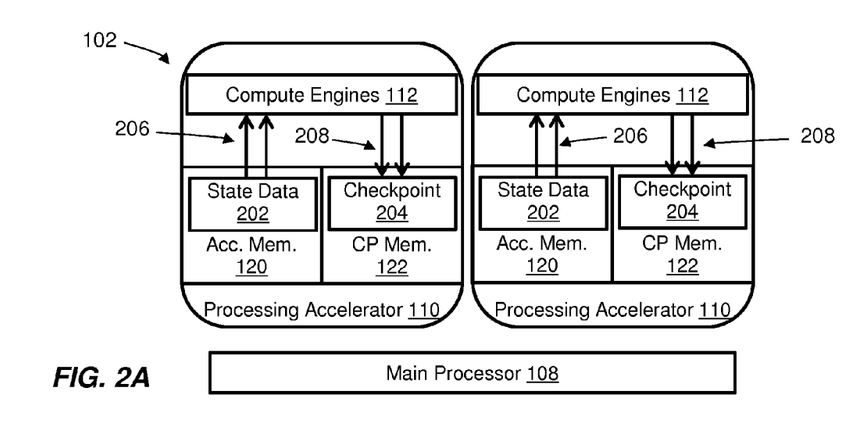
FIGS. 2A and 2B illustrate a checkpoint sequence in accordance with an embodiment.

FIGS. 2A and 2B illustrate a checkpoint sequence in accordance with an embodiment. As the tasks 124 of FIG. 1 execute, state data 202 accumulates in the accelerator memory space 120 and changes over time. When it is time to create a checkpoint 204, execution of the tasks 124 of FIG. 1 stops, and a first portion 206 of the higher speed interface 116 of FIG. 1 is used to transfer the state data 202 from the accelerator memory space 120 to the compute engines 112. Examples of when it is time to create checkpoint 204 include when memory is de-allocated, using "free( )" in C or ~ directive in C++, after a memory management epoch (also known as memory garbage collection), before or after a bursting activity of memory modifying operations in application, user-, runtime-, or compiler-inserted directives to indicate time to read, or periodically. The state data 202 is then routed on a second portion 208 of the higher speed interface 116 of FIG. 1 from the compute engines 112 to the checkpoint memory space 122 to be stored as checkpoint 204. Once creation of the checkpoint 204 is complete, then the higher speed interface 116 of FIG. 1 can be reallocated such that a greater number of links 210 than the first portion 206 are available for use between the accelerator memory space 120 and the compute engines 112, as the second portion 208 of the higher speed interface 116 of FIG. 1 is not needed for transferring the checkpoint 204 out of the checkpoint memory space 122.

Figure 2B:
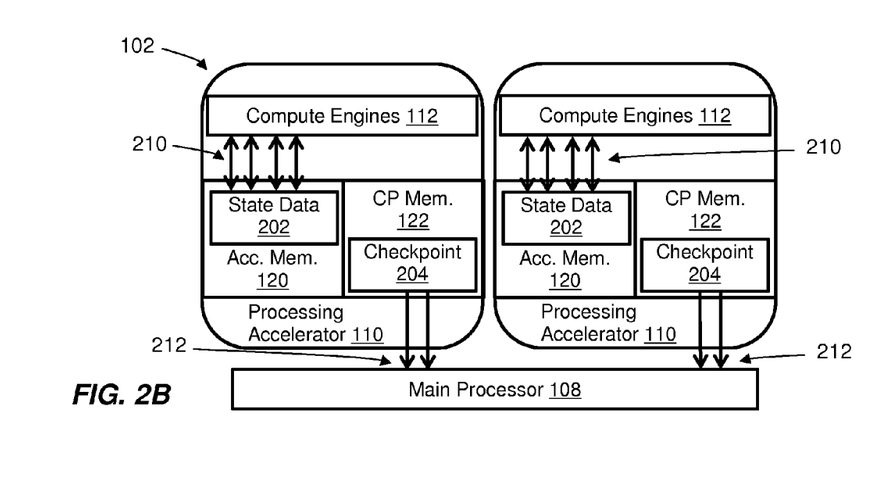

When execution of the tasks 124 of FIG. 1 resumes, the state data 202 may be updated in the accelerator memory space 120. If an error occurs, data stored in the checkpoint 204 can be used as a restore point to restart execution of the tasks 124 of FIG. 1. Since an error condition may require a full reset of the processing accelerators 110, the checkpoint 204 can be transferred to another failure domain and transferred back at a later point in time, if needed. As depicted in the example of FIG. 2B, a portion 212 of the lower bandwidth interface 118 of FIG. 1 can be used to transfer state data of the checkpoint 204 from the processing accelerators 110 to the main processor 108 of the hybrid computing node 102 while the processing accelerators 110 are executing the tasks 124 of FIG. 1. Transferring of data stored in the checkpoint 204 can be performed asynchronously.

Figure 3:
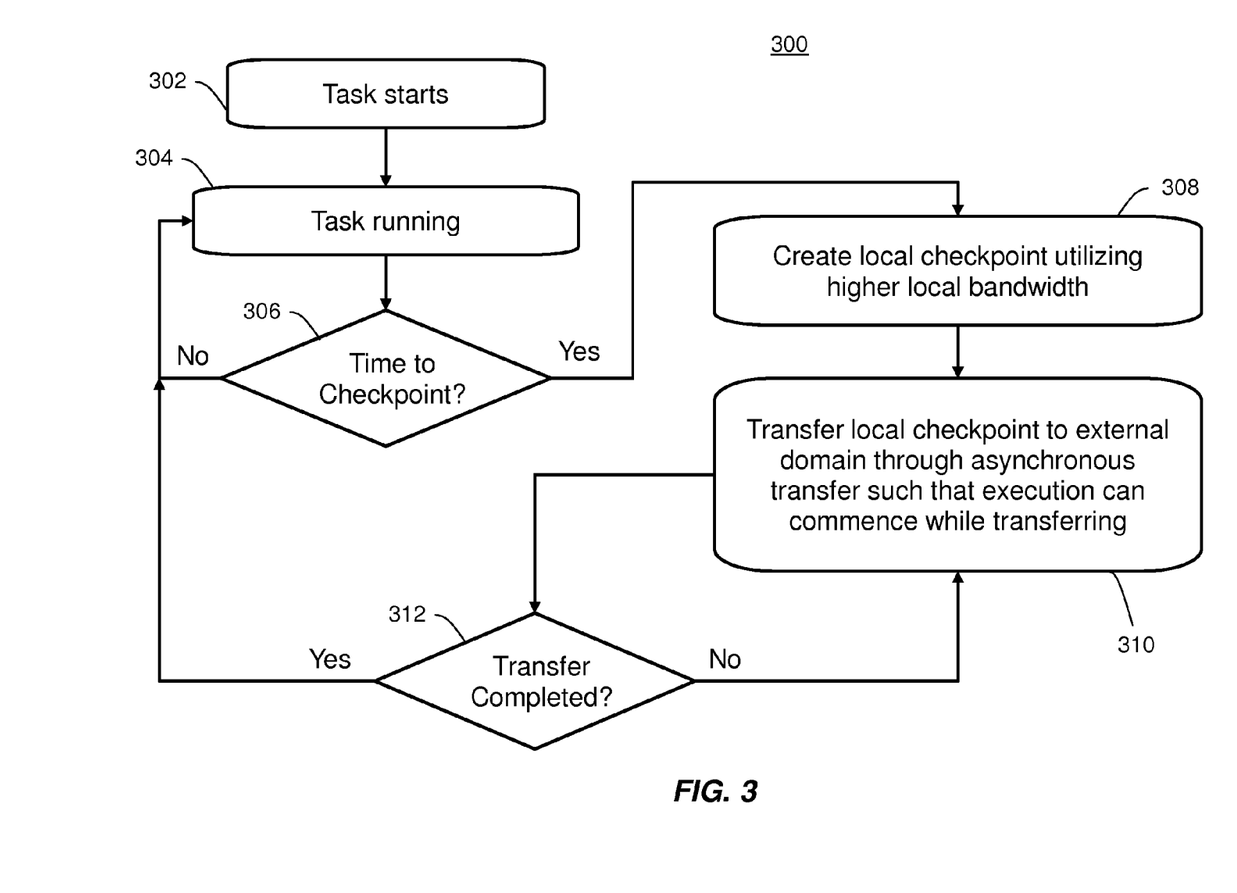
FIG. 3 is a process flow diagram for checkpointing in a hybrid computing node in accordance with an embodiment.

FIG. 3 is an example of process flow diagram 300 for checkpointing in a hybrid computing node in accordance with an embodiment. At block 302, a task starts running in a processing accelerator of a hybrid computing node. At block 304, the task continues running. At block 306, it is determined whether it is time to create a checkpoint. The time check of block 306 can be interrupt driven, or polling of a status indicator or timer value can be performed. If it is not time to create a checkpoint, the flow returns to block 304 to continue running the task. If it is time to create a checkpoint, then at block 308 a local checkpoint is created using a higher local bandwidth interface, such as the higher speed interface 116 of FIG. 1. At block 310, the local checkpoint is transferred to an external domain through an asynchronous transfer such that execution of the task can commence while transferring. At block 312, progress of the transfer of the checkpoint is monitored to determine whether the transfer has completed. If the transfer has completed, the flow returns to block 304; otherwise, the flow returns to block 310. This process can be encoded in software, hardware, or firmware within a hybrid computing node. Checkpoints may be triggered by local timers in each processing accelerator or triggered externally by a timing circuit or common command from a main processor.

Figure 4:
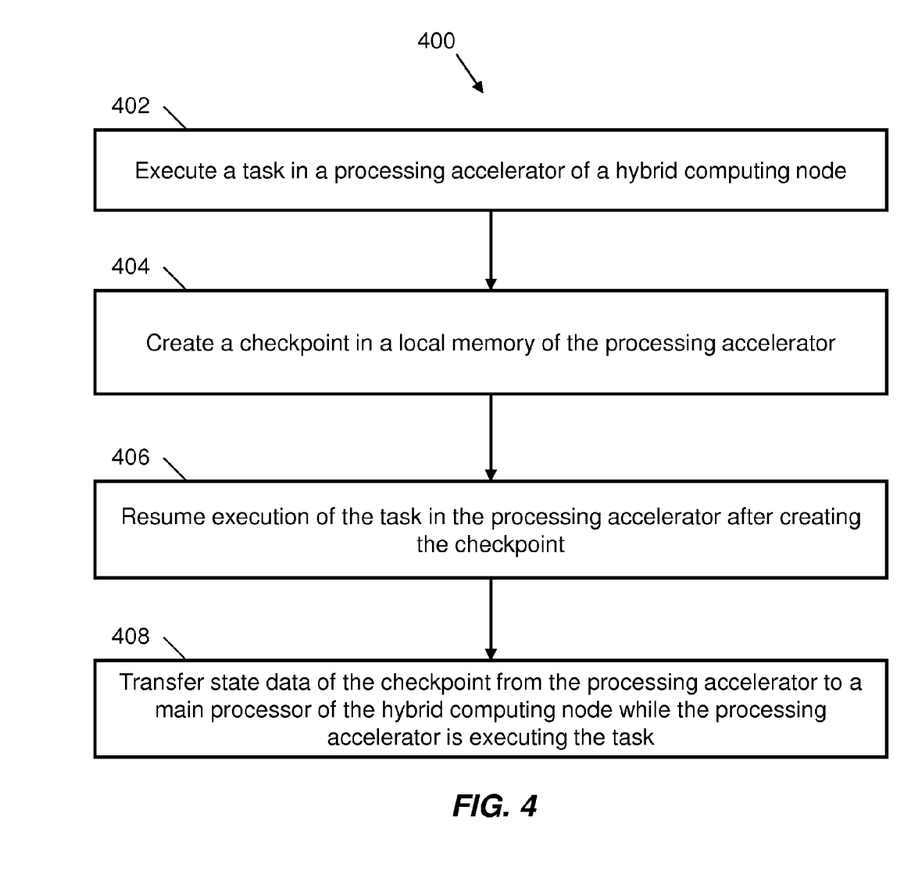
FIG. 4 is another example of a process flow diagram for checkpointing in a hybrid computing node in accordance with an embodiment.

FIG. 4 is another example of a process flow diagram of a method 400 for checkpointing in a hybrid computing node in accordance with an embodiment. The method 400 can be implemented in the hybrid computing node 102 of FIGS. 1, 2A, and 2B, and may be applicable to numerous other system configurations as well. Accordingly, the method 400 of FIG. 4 is described in reference to FIGS. 1, 2A, and 2B. To simplify the explanation, the method 400 is primarily described in reference to a single task 124 and a single processing accelerator 110; however, it will be understood that the method 400 is applicable to multiple tasks 124 per processing accelerator 110 and multiple processing accelerators 110 operable in parallel as part of the hybrid computing node 102. Execution of the method 400 can be primarily controlled by one or more of the compute engines 112 in each of the processing accelerators 110, where at least one of the compute engines 112 is a processing circuit. The local memory 114 or a portion thereof can be embodied as a tangible storage medium readable by at least one of the compute engines 112 and storing instructions for execution by at least one of the compute engines 112 to perform the method 400. Alternatively, instructions to the perform the method 400 can be stored in a removable tangible storage medium or in another tangible storage medium located elsewhere within the hybrid processing system 100.

At block 402, a task 124 is executed in a processing accelerator 110 of a hybrid computing node 102. At block 404, a checkpoint 204 is created in a local memory 114 of the processing accelerator 110. The checkpoint 204 includes state data 202 to restart execution of the task 124 in the processing accelerator 110 upon a restart operation. A restart operation can be performed as part of a recovery sequence, where the contents of the checkpoint 204 are used to restore the state data 202 in an accelerator memory space 120 after an error or system reset. The checkpoint 204 may be created periodically based on a time interval or upon demand.

At block 406, execution of the task 124 is resumed in the processing accelerator 110 after creating the checkpoint 204. This refers to a normal operating condition where no error condition is detected and execution of the task 124 can proceed. At block 408, the state data 202 of the checkpoint 204 are transferred from the processing accelerator 110 to a main processor 108 of the hybrid computing node 102 while the processing accelerator 110 is executing the task 124. The transferring of state data 202 stored in the checkpoint 204 can be performed asynchronously on a lower bandwidth interface 118 with the main processor 108. In contrast, a higher speed interface 116 is used to create the checkpoint 204 within the processing accelerator 110.

In exemplary embodiments, execution of the task 124 interacts with the accelerator memory space 120 in the local memory 114, and the checkpoint 204 is stored to a separate memory range in the local memory 114, referred to as the checkpoint memory space 122. The method 400 can be performed for multiple processing accelerators 110 in the hybrid computing node 102, where the checkpoint 204 may be created synchronously in parallel across the processing accelerators 110. The transferring of the state data 202 stored in the checkpoint 204 to the main processor 108 can be performed asynchronously, as long as the transferring completes before being overwritten by new checkpoint data. The state data 202 of the checkpoint 204 can be transferred from the main processor 108 to another memory system 126 or a network 104 for storage.

Technical effects and benefits include establishing checkpoints on a hybrid computing node. Saving state data locally in a processing accelerator using higher bandwidth interfaces available within each processing accelerator of a hybrid computing node can reduce the amount of time lost due to creating a checkpoint and thus increases overall processing throughput. Transferring of state data captured in the checkpoint can occur at a slower rate while compute engines of the processing accelerators are otherwise occupied to mask transfer latency.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for checkpointing in a hybrid computing node, the method comprising:
    executing a task in a processing accelerator of the hybrid computing node;
    creating a checkpoint in a local memory of the processing accelerator, the checkpoint comprising state data to restart execution of the task in the processing accelerator upon a restart operation;
    resuming execution of the task in the processing accelerator after creating the checkpoint; and
    transferring the state data of the checkpoint from the processing accelerator to a main processor of the hybrid computing node while the processing accelerator is executing the task, wherein the transferring is performed asynchronously on a lower bandwidth interface with the main processor, and a higher speed interface is used to create the checkpoint.

2. The method of claim 1, wherein execution of the task interacts with accelerator memory space in the local memory, and the checkpoint is stored to a separate memory range in the local memory.

3. The method of claim 1, wherein the checkpoint is created periodically based on a time interval.

4. The method of claim 1, wherein the hybrid computing node further comprises multiple processing accelerators that create the checkpoint synchronously in parallel and perform the transferring of the state data to the main processor asynchronously.

5. The method of claim 1, further comprising:
    transferring the state data of the checkpoint from the main processor to another memory system or a network for storage.

6. The method of claim 1, wherein the processing accelerator is one of a general processing unit or an active memory device.

7. A hybrid computing node comprising:
    a main processor; and
    a plurality of processing accelerators that create checkpoints synchronously in parallel and perform the transferring of state data to the main processor asynchronously, each of the processing accelerators comprising a local memory and one or more compute engines configured to perform a method comprising:
- executing a task in the processing accelerator of the hybrid computing node;
- creating a checkpoint in the local memory of the processing accelerator, the checkpoint comprising the state data to restart execution of the task in the processing accelerator upon a restart operation;
- resuming execution of the task in the processing accelerator after creating the checkpoint; and
- transferring the state data of the checkpoint from the processing accelerator to the main processor of the hybrid computing node while the processing accelerator is executing the task.

8. The hybrid computing node of claim 7, wherein execution of the task interacts with accelerator memory space in the local memory, and the checkpoint is stored to a separate memory range in the local memory.

9. The hybrid computing node of claim 7, wherein the checkpoint is created periodically based on a time interval.

10. The hybrid computing node of claim 9, wherein the transferring is performed asynchronously on a lower bandwidth interface with the main processor, and a higher speed interface is used to create the checkpoint.

11. The hybrid computing node of claim 7, wherein the processing accelerator is further configured to perform the method comprising:
- transferring the state data of the checkpoint from the main processor to another memory system or a network for storage.

12. The hybrid computing node of claim 7, wherein the processing accelerator is one of a general processing unit or an active memory device.

13. A computer program product for checkpointing in a hybrid computing node, the computer program product comprising:
a tangible storage medium that is not a signal and is readable by a processing circuit and storing instructions for execution by the processing circuit to perform a method comprising:
- executing a task in a processing accelerator of the hybrid computing node;
- creating a checkpoint in a local memory of the processing accelerator, the checkpoint comprising state data to restart execution of the task in the processing accelerator upon a restart operation;
- resuming execution of the task in the processing accelerator after creating the checkpoint; and
- transferring the state data of the checkpoint from the processing accelerator to a main processor of the hybrid computing node while the processing accelerator is executing the task, wherein the transferring is performed asynchronously on a lower bandwidth interface with the main processor, and a higher speed interface is used to create the checkpoint.

14. The computer program product of claim 13, wherein execution of the task interacts with accelerator memory space in the local memory, and the checkpoint is stored to a separate memory range in the local memory.

15. The computer program product of claim 13, wherein the checkpoint is created periodically based on a time interval.

16. The computer program product of claim 13, wherein the hybrid computing node further comprises multiple processing accelerators that create the checkpoint synchronously in parallel and perform the transferring of the state data to the main processor asynchronously.

17. The computer program product of claim 13, wherein the instructions for execution by the processing circuit to perform the method further comprise transferring the state data of the checkpoint from the main processor to another memory system or a network for storage.

* * * * *